United States Patent [19]
Dieringer

[11] 3,869,805
[45] Mar. 11, 1975

[54] TRACK LEVEL INDICATOR
[75] Inventor: Andrew M. Dieringer, Waterford, Wis.
[73] Assignee: Rexnord Inc., Milwaukee, Wis.
[22] Filed: Oct. 9, 1973
[21] Appl. No.: 404,668

Related U.S. Application Data
[63] Continuation of Ser. No. 175,464, Aug. 27, 1971, abandoned.

[52] U.S. Cl.................. 33/338, 33/366, 33/400
[51] Int. Cl............................ G01c 9/06, G01c 9/12
[58] Field of Search ............ 33/144, 338, 366, 399, 33/400

[56] References Cited
UNITED STATES PATENTS
1,260,126  3/1918  Barker .................................. 33/400
2,893,134  7/1959  Shea et al. ............................. 33/366
3,448,522  6/1969  Plasser et al. ......................... 33/366

Primary Examiner—Samuel B. Rothberg
Assistant Examiner—Steven L. Stephan
Attorney, Agent, or Firm—Kinzer, Plyer, Dorn & McEachran

[57] ABSTRACT

This is a device for checking the cross level of railroad track which may be mounted on the dashboard of a regular rail-highway vehicle. The dial is easy to read by the driver of the vehicle. It is accurate, extremely useful and a timesaver for railroad superintendents and chief engineers and the like.

2 Claims, 5 Drawing Figures

PATENTED MAR 1 1 1975        3,869,805
SHEET 1 OF 2
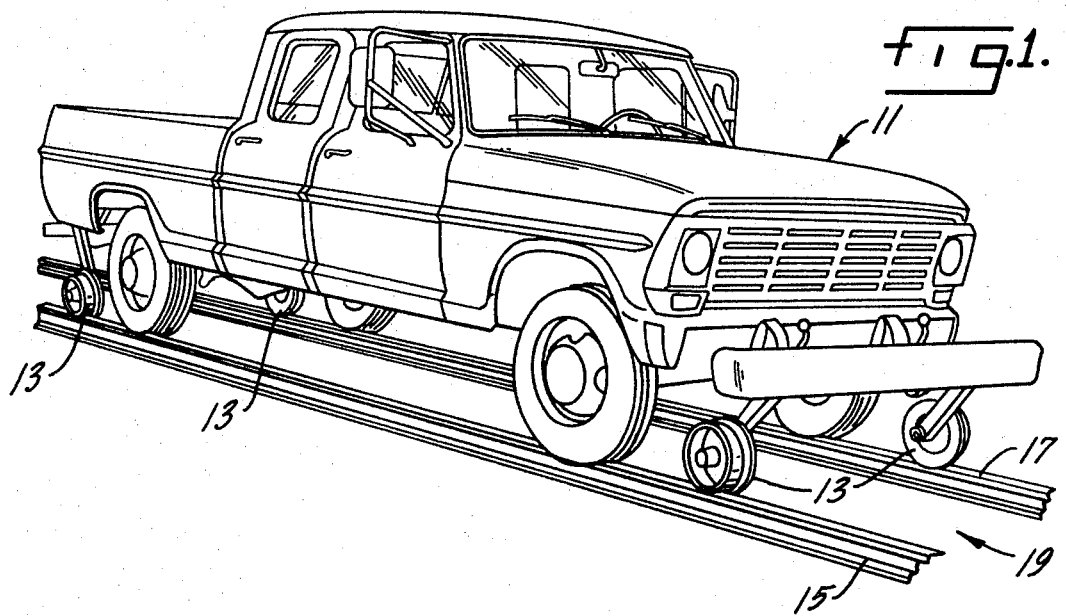
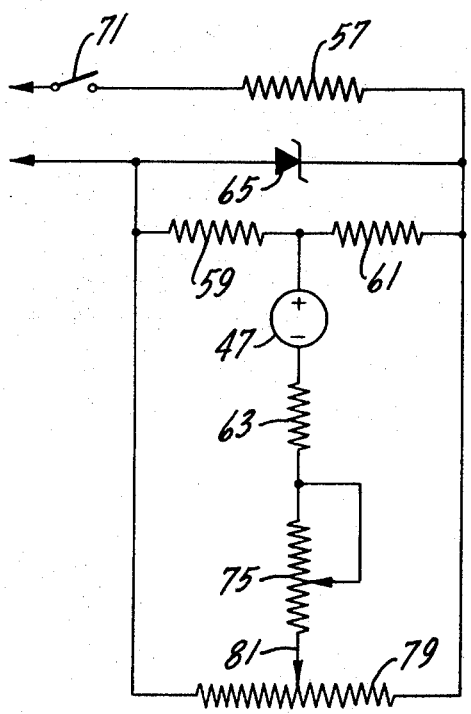
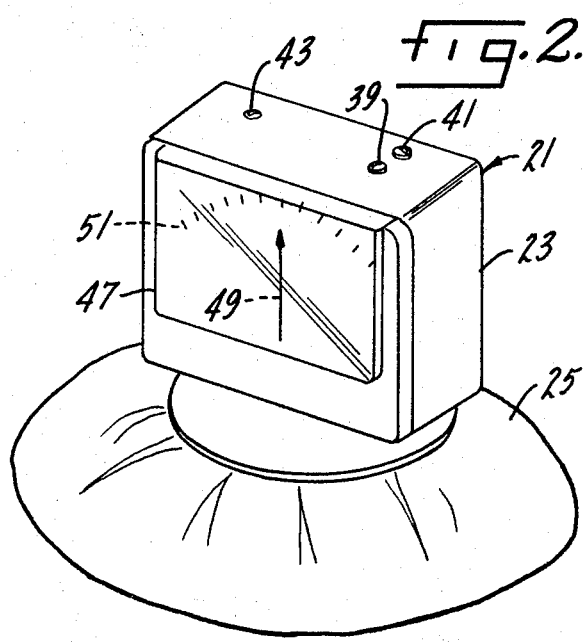
INVENTOR.
Andrew M. Dieringer
BY Parker, Markey & Plyer
Attorneys.

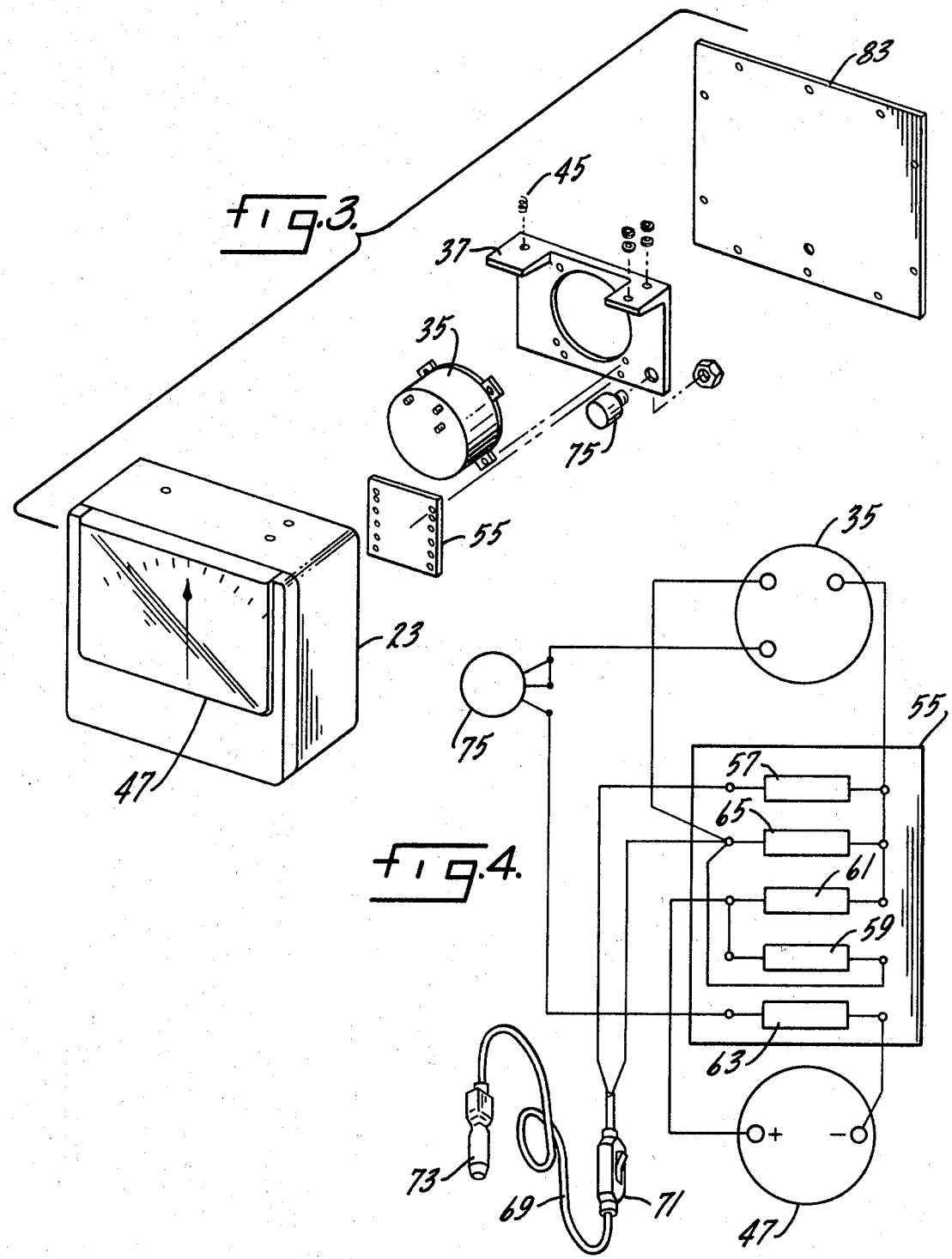

TRACK LEVEL INDICATOR

This is a continuation of application Ser. No. 175,464, filed Aug. 27, 1971, and now abandoned.

SUMMARY OF THE INVENTION

This invention is concerned with a device for visually indicating any differances in elevation between the rails of a railroad track and especially a device which can be readily mounted in a vehicle which travels on the tracks.

An object of this invention is a device which indicates in inches the difference in elevation of a pair of railroad tracks.

Another object is a device for indicating the difference in elevation between railroad tracks which is portable and may be easily installed in or removed from a vehicle.

Another object is a track level indicator which may be readily mounted in a vehicle on a dashboard, floor or seat.

Another object is a track condition indicator which may be easily leveled when installed in a vehicle.

Another object is a track level indicator which may obtain its power from a vehicle cigarette lighter.

Another object is a track level indicator which need not be permanently installed in a vehicle.

Other objects may be found in the following specification, claims and drawings.

BRIEF DESCRIPTION OF THE DRAWINGS

The invention is illustrated more or less diagrammatically in the following drawings wherein:

FIG. 1 is a perspective of a vehicle which runs on a roadway and on railroad tracks and in which is installed a level indicator of this invention;

FIG. 2 is a perspective of the level indicator;

FIG. 3 is a partial exploded view of the indicator;

FIG. 4 is a wiring diagram of the indicator; and

FIG. 5 is a schematic of the wiring diagram.

DESCRIPTION OF THE PREFERRED EMBODIMENT

FIG. 1 of the drawings shows a vehicle 11 of the type which normally travels on a road but is equipped with railroad wheels 13 which may be lowered to enable the vehicle to travel on rails 15 and 17 of a railroad track 19. A level indicator 21 includes a housing 23 attached to and supported on a bag 25 or the like which is filled with shot, sand, pebbles or other similar material to enable the bag to firmly support the housing on a non-level surface such as a dashboard, floor or seat of the vehicle 11.

Located inside the housing 23 is a pendulum potentiometer 35 mounted on a bracket 37 which is fastened to the housing 23 by means of a leveling device, for example three screws 39, 41 and 43. Two of these screws 39 and 41 are located at one end of the bracket and the other 43 is located at the opposite end of the bracket. Screw 43 may extend through a spring 45 to permit adjustment of the bracket and the pendulum potentiometer in the housing 23. Mounted on the face or front of the housing is a conventional ammeter 47 or the like having a pointer 49 which moves across scale 51 suitably calibrated in inches of elevation.

Mounted on a suitable terminal board 55 located in the housing 23 are resistors 57, 59, 61 and 63. Resistor 57 may have a value of 100 ohms. Resistors 59 and 61 may be each 5,110 ohms and resistor 63 may be 75,000 ohms. Also mounted on the terminal board 55 is a zener diode 65. A power supply cord 69 connects to the terminal board 55 and extends to the outside of the housing 23. Located in the power cord line is an on-off switch 71 and a plug 73 which fits into a vehicle cigarette lighter. A variable resistor 75 of, say, 100,000 ohms value may be provided for calibrating the circuit.

The pendulum potentiometer may contain a resistance 79 and a variable contact member 81 which is mounted on the pendulum and arranged to sweep across the resistance 79 as the housing and pendulum move relative to each other. As shown in FIG. 5, the resistance 79 of the pendulum potentiometer is arranged with the resistors 59 and 61 and the ammeter 47, resistor 63 and variable resistor 75 in a bridge circuit. A panel 83 forms the back of the housing 23.

While certain values for the resistors and components have been given above, it should be understood that these are merely examples and the invention is not limited thereto. Also, the particular bridge circuit shown is only an example and others of suitable or conventional type may be used.

The use, operation and function of this invention are as follows:

The track condition indicator of this invention is particularly intended for use by railroad maintenance supervisors and track engineers who wish to determine the general condition of a section of track with more accuracy than that obtained by a "seat of the pants" inspection of the track in question. This invention may be easily installed in and removed from vehicles of the over-the-road type which are adapted to also ride on railroad tracks through the use of retractable railroad wheels 13.

When the over-the-road vehicle 11 is positioned on the rails 15 and 17 with the railroad wheels 13 engaging the rails, the level indicator 21 is placed inside the vehicle on the dashboard, floor or seat. The bag 25 on which the housing 23 is supported adapts itself to its supporting surfaces. The device has been shown as mounted on a beanbag, if I may call it that, which may be quite suitable for demonstration purposes, or for actual use in a vehicle. On the other hand, a U-shaped bracket or something in the nature of a swivel for attachment or a standard bracket of the owner's choice may be used. Since the dashboards of various vehicles vary considerably, the particular mounting arrangement is not considered critical.

Checking track level used to be one of the most tedious jobs in railroad maintenance. The tool used was a long bubble-type level, suspended across the two rails. The operator would set the level on the track, check for variations, then pick up the level, walk down the track and repeat the operation.

The present invention is in the nature of a compact instrument which permits rapid pinpointing of variations in track level from the comfort of a rail-highway vehicle. The savings in time and manpower, combined with assured accuracy of readings, result in a substantial savings in a short period. The device is in the nature of a sensitive level-measuring device which notices even the slightest variations in track level, and this variation is displayed in inches on a large easy-to-read dial which may be substantially magnified.

Operation of the device is very simple and requires no skill or electronic knowledge. Once the vehicle is on track that is known to be level, the operator may check to see that the dial reads 0. If it does not, the operator can set the pointer to 0 by adjusting the single screw, designated 45 in FIG. 3. Then he's ready to roll. As the vehicle moves down the track, the operator watches for variations indicated on the dial. The speed of the vehicle may run up to as great as 15 mph. The operator can pinpoint the problem areas for the leveling crews which follow by marking the ties, for example with paint, or by noting mile poles or what-have-you.

The unit is intended to work on a 12 v system since this is what is normally available in automobiles.

The power for the unit may be obtained by a plug which fits into the cigarette lighter receptacle. Or the unit may be wired into the vehicle's electrical system.

The operation of the circuit itself involves the unbalancing of the bridge circuit by the pendulum. The wiper is pivoted from the center with a heavy weight which is a pendulum. As the outside case tends to turn because the vehicle is on a section of track not level, the wiper moves across resistance filament 79 which unbalances the bridge circuit. The unbalance is registered on an ammeter which may be calibrated in inches of elevation of one rail relative to the other.

One of the important features of the invention is the adjustment 43 which allows the operator to position the device on 0. In effect, the assembly inside the housing is pivoted slightly, either up or down, about one side, be it the left or right side, until the pointer is on 0. In effect, the circuitry and pendulum may be tilted slightly inside of the main housing so that even though the outer housing may be at a slight angle, the circuitry and pendulum will be true to the vertical. Thus, inaccuracies in mounting or position of the unit are of no importance. Direction can be obtained quickly and easily by untrained personnel. It also may be applied independently in each job or section of track without a recalibration and change in the physical structure or mounting of the vehicle.

Whereas, the preferred form of the invention has been described and shown, it should be understood that there are modifications, alterations and changes which may be made without departing from the teachings of the invention. Therefore, the scope of the invention should be only limited by the claims attached hereto.

I claim:

1. A railroad track level indicator for installation in a vehicle of the type which travels on railroad tracks, said indicator being constructed and adapted to show differences in elevation between the rails and including a housing constructed and arranged to be mounted on the vehicle, an electric bridge circuit mounted in the housing, a bracket adjustably mounted in the housing, a pendulum mounted on the bracket, a variable contact mounted on the pendulum and movable along one of the resistances in the bridge circuit upon movement of the pendulum and the housing relative to each other as the vehicle moves along the tracks to indicate an out of level condition, an ammeter connected in the bridge circuit having a scale calibrated in inches of elevation and a pointer movable across the scale in response to differences of potential in the bridge circuit, the adjustable mounting for the bracket and relative to the housing including a pivotal connection for one end of the bracket on one side of the housing so that the bracket may be pivoted about an axis which is generally paralled to the rails; and a spring-biased, manually operable adjustment on the other side of the housing between the bracket and the housing with operable means extending through the housing so that the bracket may be adjusted to and firmly held at a position wherein said pointer will point to the zero position on the scale while the vehicle is on a section of level track, and means for connecting the bridge circuit to a source of power.

2. The structure of claim 1 further characterized in that the manually operable adjustment extends through the top of the housing so that adjustments may be made on top of the housing when the indicator is mounted in a vehicle.

* * * * *